United States Patent
Kim et al.

(10) Patent No.: US 6,996,180 B2
(45) Date of Patent: Feb. 7, 2006

(54) FAST HALF-PIXEL MOTION ESTIMATION USING STEEPEST DESCENT

(75) Inventors: Hyun Mun Kim, Scottsdale, AZ (US); Hyung-Suk Kim, Chandler, AZ (US); Tinku Acharya, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 717 days.

(21) Appl. No.: 09/947,266

(22) Filed: Sep. 5, 2001

(65) Prior Publication Data

US 2003/0067988 A1    Apr. 10, 2003

(51) Int. Cl.
*H04N 7/12* (2006.01)

(52) U.S. Cl. .............................. 375/240.16; 375/240.17

(58) Field of Classification Search .......... 375/240.16, 375/240.17; 348/416.1, 699; 382/236, 238; 386/111

See application file for complete search history.

(56) References Cited

U.S. PATENT DOCUMENTS

| 5,623,313 A | * | 4/1997 | Naveen ................. 375/240.17 |
| 6,141,382 A | * | 10/2000 | Krishnamurthy et al. ..................... 375/240.17 |
| 6,442,203 B1 | * | 8/2002 | Demos .................. 375/240.16 |

OTHER PUBLICATIONS

Netravali et al., "A codec for HDTV", IEEE Transactions on Consumer Electronics, vil. 38, Issue: 3, pp. 325-340, Aug. 1992.*

* cited by examiner

*Primary Examiner*—Vu Le
(74) *Attorney, Agent, or Firm*—Marger Johnson & McCollom P.C.

(57) ABSTRACT

A method of locating a half-pixel resolution motion vector. The method first determines a sum of absolute difference for a predetermined number of neighbors to a current pixel. The gradient of these sums of absolute differences is then calculated. A motion vector is then selected based upon the gradient that indicates which vector lies in a direction of steepest descent. This motion vector is then used in motion compensation for video compression.

13 Claims, 4 Drawing Sheets

FAST HALF-PIXEL MOTION ESTIMATION USING STEEPEST DESCENT

BACKGROUND

1. Field

This disclosure relates to compression of video sequences, more particularly compressing the images using predictive coding techniques with motion estimation.

2. Background

Transmission of video content in digital form opens up many avenues of broadcast that were not previously available. Information associated with the video content can now be transported along with the content, allowing programming guides, program summaries and other information to be made available to users. Video data can be packaged into the various data 'slices' such as Internet Protocol packets, Frame Relay frames, etc., and routed across data networks.

One drawback of digital video data is that it consumes rather large amounts of bandwidth unless compressed. Compression and decompression of the data allows the images to be reproduced without using as much bandwidth. Most compression techniques strive to provide the largest amount of compression with the lowest amount of error. The tradeoff between reconstructed image quality and the amount of compression obtainable is the focus of many different types of compression techniques.

One such technique is that which will be referred to here as predictive coding. An example of this technique is that which is used in the Moving Pictures Experts Group (MPEG) standards. In these techniques, the frames of the video sequences are determined to be either I, P, or B, pictures. I pictures are intracoded pictures, coded without reference to other pictures. Moderate compression is achieved by reducing spatial redundancy, but not temporal redundancy. They can be used periodically to provide access points in the bit stream where decoding can begin. P frames or pictures are predictive pictures and can use the previous I- or P-picture for motion compensation and may be used as a reference for further prediction. P-pictures offer increased compression compared to I-pictures. B pictures are bidirectionally-predictive pictures and can use the previous and next I- or P-pictures for motion-compensation, and offer the highest degree of compression.

Motion estimation allows the reconstruction of the pictures to reduce temporal redundancy between successive frames. In this manner, information that is repeated between frames is not unnecessarily repeated. Many different types of motion compression methods exist. However, they typically are all very complex and require significant computation power and resources to accurately portray motion between the frames. Another tradeoff exists here, between accuracy and complexity. More accurate motion compensation provides more accurate reconstruction with better compression. However, more accurate motion compensation requires more complex motion estimation techniques. This in turn results in either more complex hardware or more powerful software processing methods.

It would be useful to have accurate motion estimation techniques that do not require the increased complexity of current techniques.

BRIEF DESCRIPTION OF THE DRAWINGS

The invention may be best understood by reading the disclosure with reference to the drawings, wherein.

DETAILED DESCRIPTION OF THE EMBODIMENTS

Figure 1:
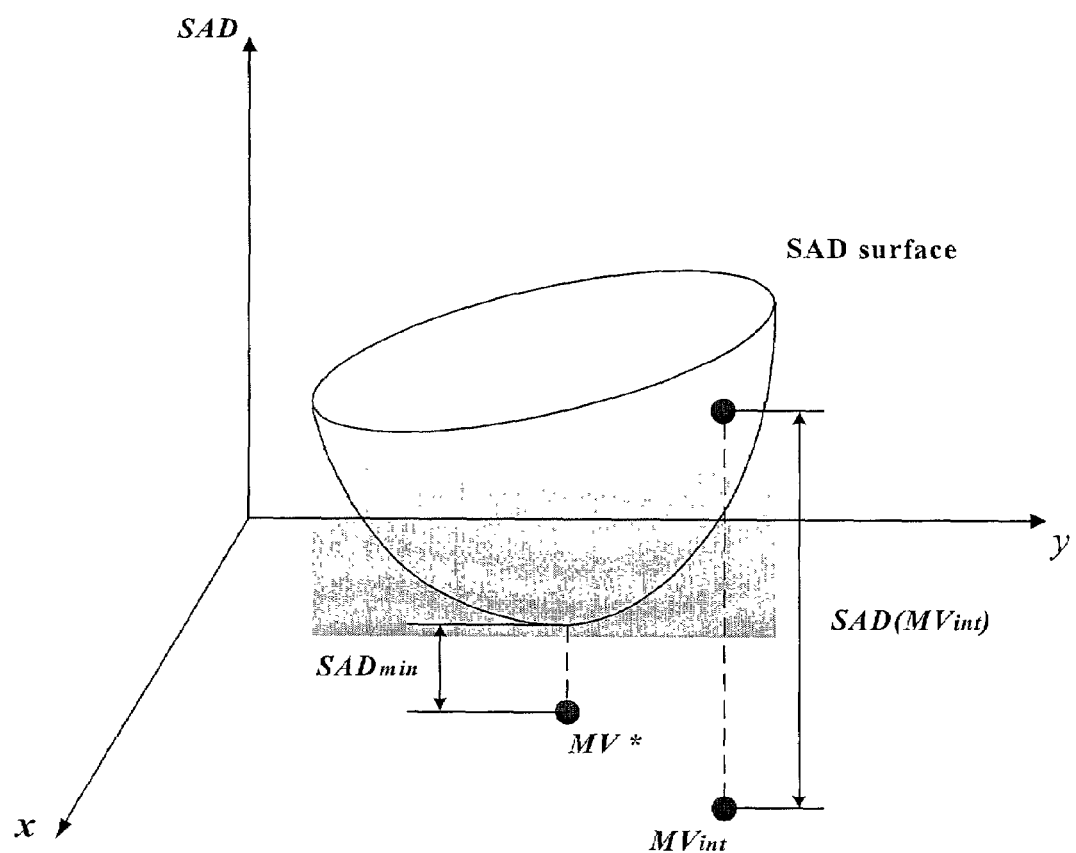
FIG. 1 shows a graphical representation of a sum of absolute difference motion estimation surface, in accordance with the invention.

One objective of motion estimation is to reduce temporal redundancy between successive frames. Reduction of redundancies allows for higher compression percentages while maintaining image quality. Motion estimation finds a block from the reconstructed frames that gives the best match to a block undergoing processing within a search window. The search window size is largely dependent upon the processing power of the system.

In many compression techniques, the compression is performed using blocks of picture elements. These blocks of picture elements (pixels) are sometimes referred to as macroblocks. The search window is typically defined in terms of a number of pixels or macroblocks wide and a number of pixels or macroblocks high. The portion of the image data defined by the current search window is compared to the current pixel undergoing compression and the best match is found.

One of the commonly used metric for motion estimation in standards such as MPEG-2 and MPEG-4 is sum of absolute difference (SAD). SAD is defined as follows:

$$SAD = \sum_{j=0}^{15} \sum_{i=0}^{15} | C[i,j] - R[x_0 + x + i, y_0 + y + j] |$$

where $(x_0, y_0)$ are the upper left corner coordinates of the current macroblock, $C[x,y]$ is the current macroblock luminance samples, and $R[x,y]$ is the reconstructed previous frame luminance samples.

The SAD within the search window is calculated where the search range S is $\{(x, y): -16 \leq x, y < 16\}$. The coordinate $MV=(MV_x, MV_y)$ that results in the minimum SAD is the motion vector for the current macroblock where $MV_x$ and $MV_y$ are the horizontal and vertical components of the motion vector MV.

However, the motion vectors are estimated on integer resolution. To increase the coding efficiency, also known as half-pixel, motion estimation was introduced in MPEG video. It finds the motion vector on resolution. This increases the accuracy of the motion prediction and therefore reduces the errors between the reconstructed images and the original images.

Half-pixel motion estimation requires interpolation of the frames using bilinear transformation since pixel values are not available in half-pixel resolution as shown below. Half-pixel resolution means that values must be determined for a grid that has twice the resolution of the integer pixel grid. If an image has an image of 640 horizontal pixels by 480 vertical pixels, a half-pixel resolution would have 1280 horizontal pixels and 960 vertical pixels. These pixel values that lie between the integer pixel values must be determined mathematically.

The interpolation adds additional complexity and memory requirements. Also, MPEG-4 permits motion vectors of 8×8 blocks with half-pixel resolution. Therefore, for each macroblock the candidate motion vectors are 5 (one for 16×16 MB and 4 for 8×8 blocks). To reduce the half-pixel ME complexity, processes usually search the 8 neighboring points centered by the integer-pixel motion estimation. But it still requires 5×8=40 additional search points for each macroblock along with interpolation.

The half sample values are found using the bilinear interpolation as shown below. In a grid of pixels, shown as capital letters in boldface type, the half-pixel values are shown in lower case type.

| Aa | b | B |
|----|---|---|
| c  | d |   |
| C  |   | D |

The formulas for determining the half-pixel values by bilinear interpolation are:

a=A, b=(A+B+1)/2 c=(A+C+1)/2, d=(A+B+C+D+2)/4; where the symbol '/' denotes division by truncation.

The motion vector resulting in the best match during the half sample search is the final motion vector.

One embodiment of this invention is a half-pixel motion estimation methodology to find the half-pixel motion vector by looking at only one neighboring search point instead of 8. As a result the computational complexity is reduced to $1/8^{th}$ compared to the traditional methods. The experimental results show that the visual quality of the video clips applying this new methodology is same as the traditional half-pixel motion estimation technique, as will be discussed in more detail further.

One aspect of the invention takes into account that the sum of absolute difference (SAD) error surface will be monotonic once the integer-pixel motion vector is located. Note that the SAD surface is inherently an error surface as the quantities being graphically represented are differences. This is a legitimate and crucial assumption since the maximum displacement of the best matching block is within ±1 pixel. Therefore, it can be assumed that the SAD error surface is bowl-shaped with the minimum located above the motion vector that gives the minimum SAD as shown in FIG. 1.

Assume a ball is placed on this error surface just above the integer motion vector. If the ball is released it would roll down toward the minimum of the surface. It would initially roll in a direction opposite to the direction of maximum rate of change of the surface. Opposite as used here means that the ball would roll towards the minimum, while the gradient would rise up in the direction of the maximum rate of change of the surface.

Figure 2:
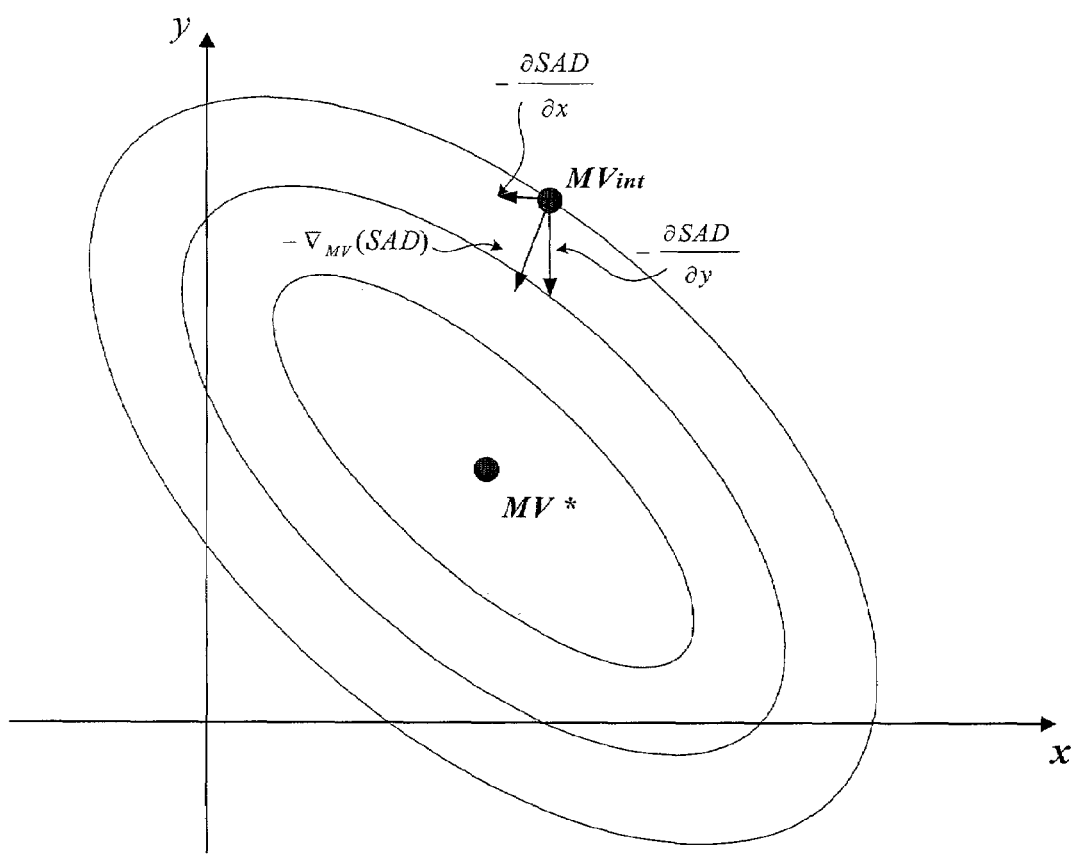
FIG. 2 shows a graphical representation of the gradient of a sum of absolute difference motion estimation surface, in accordance with the invention.
Figure 3:
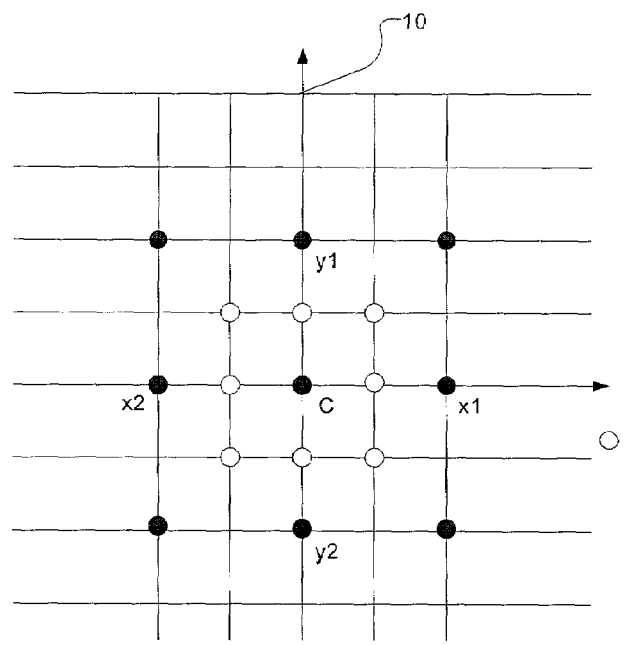
FIG. 3 shows a block diagram of a current pixel and its nearest neighbors used in locating a sub-pixel candidate motion vector, in accordance with the invention.

The direction of maximum rate of change of the surface is the gradient and the opposite direction is that of steepest descent as shown in FIG. 2. Using the direction of steepest descent, which is the opposite of the gradient, one embodiment of the method searches at only one additional search point instead of 8 to find the half-pixel motion vectors. FIG. 3 shows the 8 candidate sub-pixel positions centered by C that is integer-pixel motion vector 10.

Figure 5:
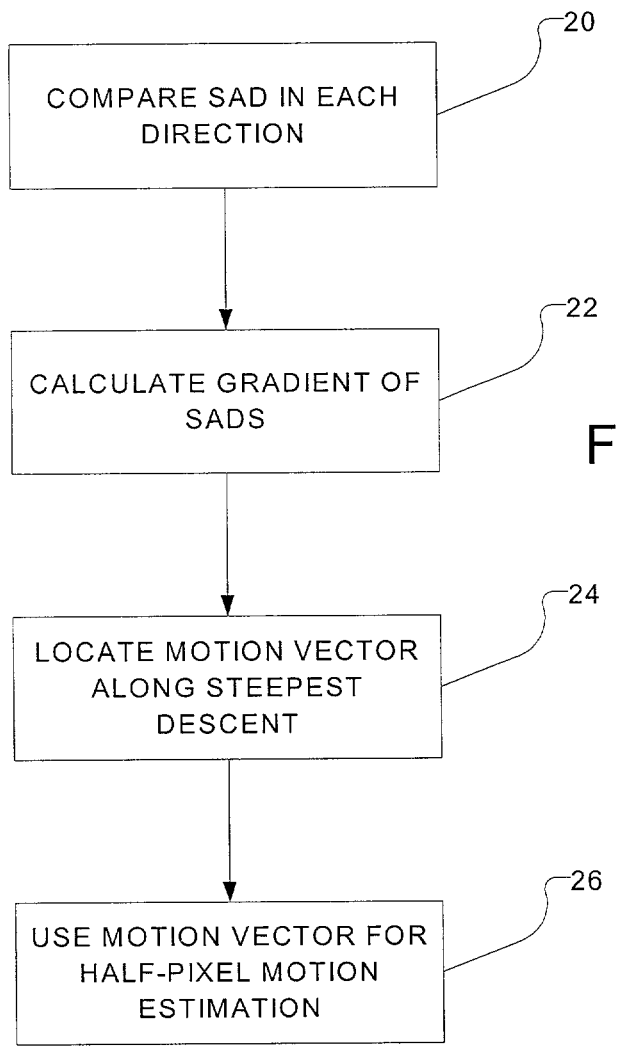
FIG. 5 shows a flowchart of one embodiment of a method to determine a motion vector to be used for motion estimation, in accordance with the invention.

FIG. 5 shows a flowchart of one embodiment of method that uses these characteristics to determine the half-pixel motion vector for a frame of video data. At 20, the sum of absolute differences (SAD) is determined in each of the four candidate directions centered on the motion vector C shown in FIG. 3.

An example of this calculation is shown below:

$DX_1 = SAD(X_1) - SAD(C)$ $DX_2 = SAD(X_2) - SAD(C)$ $DY_1 = SAD(Y_1) - SAD(C)$ $DY_2 = SAD(Y_2) - SAD(C)$.

Note that the SAD values are already available since they need to be calculated for integer pixel motion estimation. Referring back to FIG. 5, the process then calculates the gradient of SAD in each direction at 22. An example of such a calculation is shown below.

$$\frac{\partial SAD}{\partial x} = \frac{SAD(X + \Delta X) - SAD(X)}{\Delta X}$$
$$\cong \text{sign}(DX_1 - DX_2) \cdot \max(DX_1, DX_2),$$

$$\frac{\partial SAD}{\partial y} = \frac{SAD(Y + \Delta Y) - SAD(Y)}{\Delta Y}$$
$$\cong \text{sign}(DY_1 - DY_2) \cdot \max(DY_1, DY_2).$$

Figure 4:
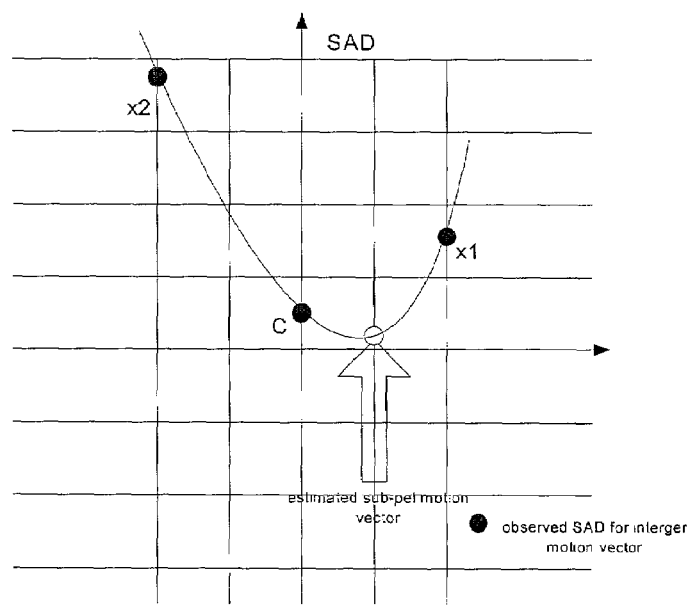
FIG. 4 shows a graphical representation of a cross section of an error surface along an x-axis, in accordance with the invention.

The difference between 2 points is taken because the resolution of integer motion vector is not fine enough. Using one point gives the misleading information in finding the gradient as shown in FIG. 4. For example, if $DX_1$ is smaller than $DX_2$ it is more probable that the minimum along the x-axis exists in the segment between C and $X_1$ than in the segment between C and $X_2$ as monotonocity in the error surface was assumed. The gradient using point $X_1$ is shown here to be an incorrect option.

After calculating the gradient, the motion vector along the direction of steepest descent is found at 24. In one embodiment the gradient is defined as:

$$\nabla_{MV}(SAD) = \left(\frac{\partial SAD}{\partial x}, \frac{\partial SAD}{\partial y}\right).$$

One goal of this process is to find the half-pixel motion vector using one of the neighboring points that are located along horizontal, vertical or diagonal. This direction does not necessarily coincide with the steepest descent direction. Therefore, the process needs to approximate this steepest direction as one of the candidate motion vector direction. One embodiment of a means for making this approximation employs a set of rules.

If the equation $$\left(\alpha \cdot \text{ABS}\left(\frac{\partial SAD}{\partial x}\right) > \text{ABS}\left(\frac{\partial SAD}{\partial y}\right)\right)$$

is true, it will find the motion vector along x-axis using the opposite directions of the gradient. If that is not true, the process determines if $$\left(\beta \cdot \text{ABS}\left(\frac{\partial SAD}{\partial x}\right) < \text{ABS}\left(\frac{\partial SAD}{\partial y}\right)\right)$$

is true. If true, it will find the motion vector along the y-axis using the opposite direction of the gradient. If that is not true, then the motion vector is found to be along both the x- and y-axis using the opposite directions of the gradient. In one embodiment, $\tan^{-1} \alpha = 40°$ and $\tan^{-1} \beta = 60°$ were used to favor the horizontal movement. Once located, the half-pixel motion vector is used for motion estimation at 26.

As a result of using this process, the encoder used for compression has reduced complexity. The encoder complexity mainly comes from the motion estimation, so fast motion estimation is possible due to reduced search points. Application of this invention also reduces the interpolation requirement. A encoder using this invention needs only one interpolation and the interpolated block becomes the predictor block.

In order to demonstrate efficiency of the process discussed above, experiments were performed. It is necessary to define two terms "hit rate" and "effective hit rate" here. The "hit rate" is the case when the actual half-pixel motion vector is found using the proposed algorithm. The effective hit is defined as the case in which the SAD difference between the actual minimum and the fast search minimum is less than 128 which is 0.5 pixel value difference average for 16×16 macroblock. Using actual coders allowed for a comparison of the PSNR (peak signal to noise ratio) difference. The results are summarized below.

| Image | Exact Hit Rate [%] | Effect Hit Rate [%] | SAD/MB | Avg. PSNR using 9 points [dB] | Avg. PSNR using 1 point [dB] |
|---|---|---|---|---|---|
| Image 1 | 60.10 | 95.20 | 26.62 | 33.75 | 33.71 |
| Image 2 | 92.93 | 93.94 | 101.13 | 34.26 | 34.09 |
| Image 3 | 98.99 | 100 | 0.66 | 35.03 | 35.05 |

The experimental results show that objective quality metrics of the experimental video clips (proposed by MPEG committee) in terms of PSNR is approximately 0.2 dB less than the traditional computationally complex approach which is practically indistinguishable in terms of the subjective visual quality. However the computational requirement in application of the invention is reduced by approximately 90% making it suitable for real-time video compression applications such as in a handheld mobile device. Application of this invention then envisions the ability to stream compressed video to a hand-held viewing device.

The methods of this invention may be implemented in either hardware or software, or a combination of a specialized encoder/decoder (codec) running a firmware program. In the case of a software implementation, the methods of the invention will be implemented by computer-readable code that performs the method of the invention when executed. The computer-readable code may be contained in some article, such as a diskette, compact disk, or digital signal processor image file, as examples. If a codec is used that is a digital signal processor or other type of processor, it will be configured to perform the processes of the invention.

Figure 6:
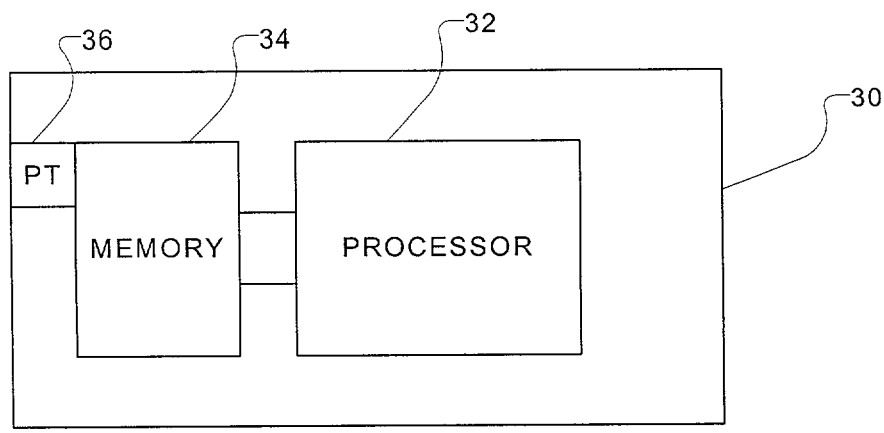
FIG. 6 shows one embodiment of an encoder operable to perform half-pixel motion estimation, in accordance with the invention.

One example of such a codec is shown in FIG. 6. The codec 30 may be implemented by configuring a general-purpose processor, such as a central processing unit in a computer, using a digital signal processor, or any other type of processing element 32. The processor receives the video data to be encoded, or compressed, through an input port 36. The input port may be an input line on the processor, or may be a input line into a memory 34, as shown in FIG. 6. As shown in some of the examples above, motion estimation may be done using data for more than one video interval, such as a frame or field. In these examples, the codec will also have a memory of some type to store at least a portion of the data from a previous interval, such as a line or block.

Thus, although there has been described to this point a particular embodiment for a method and apparatus for fast motion estimation using steepest descent, it is not intended that such specific references be considered as limitations upon the scope of this invention except in-so-far as set forth in the following claims.

What is claimed is:

1. A method of motion estimation, the method comprising:
    determining a sum of absolute differences between samples of a current frame and reconstructed samples from a previous frame for a predetermined number of neighbors to a current pixel;
    calculating a gradient of the sum of absolute differences for each of the neighbors;
    determining a motion vector using the gradients, wherein the motion vector lies in a direction of steepest descent;
    approximating the steepest descent using a set of candidate vectors selected from neighboring points located along the horizontal, vertical or diagonal; and
    using the motion vector to perform half-pixel motion compensation.

2. The method of claim 1, wherein the predetermined number of neighbors is substantially equal to four.

3. The method of claim 1, wherein determining a motion vector using the gradients further comprises using only one of the predetermined number of neighbors.

4. The method of claim 1, wherein the direction of steepest descent is opposite the direction of a maximum gradient.

5. An article containing machine-readable code that, when executed, causes a machine to:
    determine a sum of absolute differences between samples from a current frame and reconstructed samples from a previous frame for a predetermined number of neighbors to a current pixel;
    calculate a gradient of the sum of absolute difference for each of the neighbors;
    determine a motion vector using the gradients, wherein the motion vector lies in a direction of steepest descent;
    approximate the steepest descent using a set of candidate vectors selected from neighboring points located along the horizontal, vertical or diagonal; and
    use the motion vector to perform half-pixel motion compensation.

6. The article of claim 5, wherein the predetermined number of neighbors is substantially equal to four.

7. The article of claim 5, wherein the code causing the machine to determine a motion vector contains further code that, when executed, causes the machine to determine a motion vector using the gradients further comprises using only one of the predetermined number of neighbors.

8. The article of claim 5, wherein the direction of steepest descent is opposite the direction of a maximum gradient.

9. An encoder, comprising:
   an input port operable to receive video data;
   a processor operable to perform half-pixel motion estimation using a half-pixel motion vector, wherein the processor determines the half-pixel motion vector by:
      determining a sum of absolute differences between samples from a current frame and reconstructed samples from a previous frame for a predetermined number of neighbors to a current pixel;
      calculating a gradient of the sum of absolute difference for each of the neighbors;
      determining a motion vector using the gradients, wherein the motion vector lies in a direction of steepest descent; and
      approximating the steepest descent using a set of candidate vectors selected from neighboring points located along the horizontal, vertical or diagonal.

10. The encoder of claim 9, wherein the encoder further comprises a digital signal processor.

11. The encoder of claim 9, wherein the encoder further comprises a general-purpose processor.

12. The encoder of claim 9, wherein the input port is coincident with the processor.

13. The encoder of claim 9, wherein the encoder further comprises a memory operable to store at least a portion of one interval of incoming video data.

* * * * *